(No Model.)

F. S. YOUNG.
DEVICE FOR DISTRIBUTING FENCE WIRE.

No. 589,490. Patented Sept. 7, 1897.

Attest:
S. G. Wells.
M. Smith

Inventor:
F. S. Young,
By Higdon, Longan & Higdon, attys.

UNITED STATES PATENT OFFICE.

FRED S. YOUNG, OF IUKA, ILLINOIS.

DEVICE FOR DISTRIBUTING FENCE-WIRE.

SPECIFICATION forming part of Letters Patent No. 589,490, dated September 7, 1897.

Application filed May 3, 1897. Serial No. 634,879. (No model.)

*To all whom it may concern:*

Be it known that I, FRED S. YOUNG, of the city of Iuka, Marion county, State of Illinois, have invented certain new and useful Improvements in Devices for Distributing Fence-Wire, of which the following is a full, clear, and exact description, reference being had to the accompanying drawings, forming a part hereof.

My invention relates to devices for distributing fence-wire; and it consists of the novel construction, combination, and arrangement of parts, hereinafter shown, described, and claimed.

Figure 1:
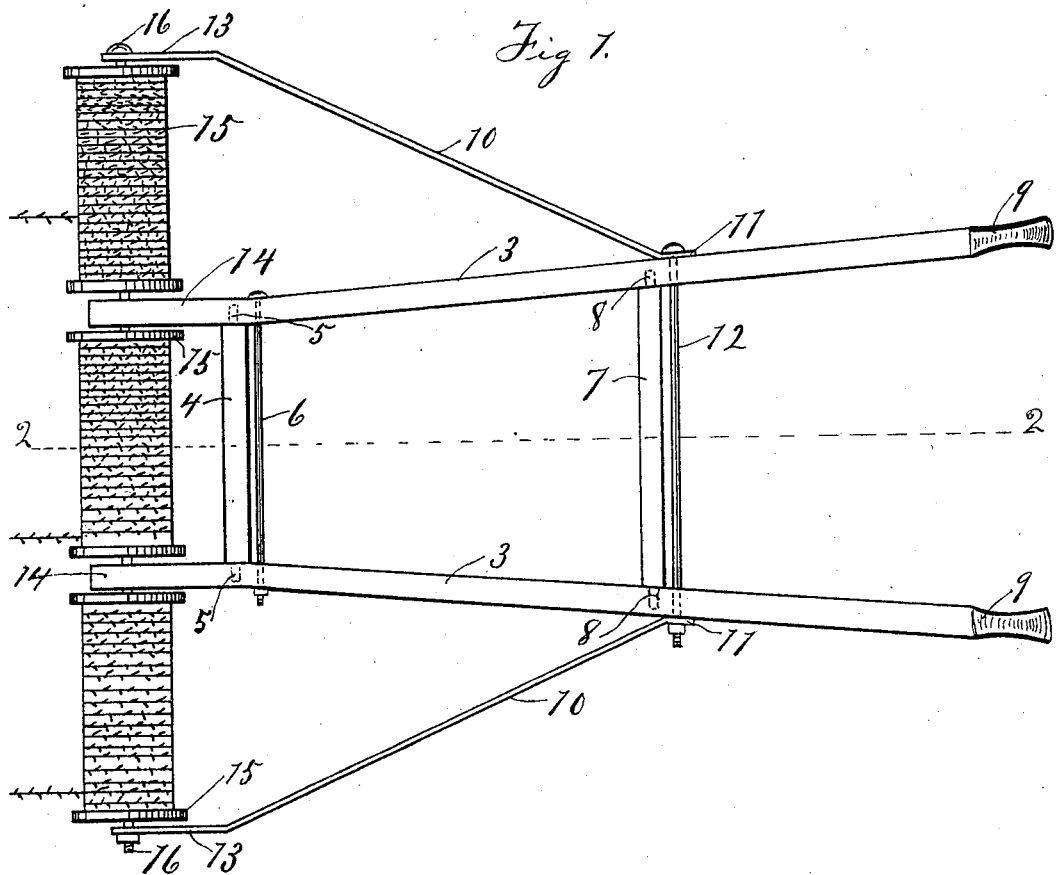
Figure 2:
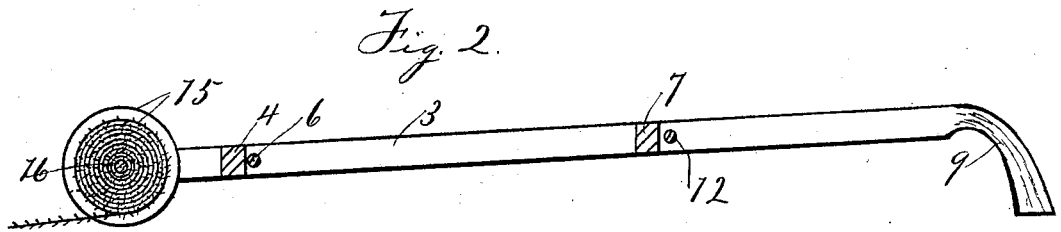

Figure 1 is a plan view, and Fig. 2 is a sectional view taken approximately on the line 2 2 of Fig. 1.

Referring by numerals to the drawings, the wooden bars 3 are placed side by side, and a cross-piece 4 has tenons 5 projecting from its ends into mortises in the side bars 3, and the bolt 6 is inserted through the side bars 3 at points adjacent to the cross-piece 4 and holds the bars together at their rear ends. The cross-piece 7 is slightly longer than the cross-piece 4 and has tenons 8, which engage in mortises in the side bars 3. The forward ends of the side bars 3 are crooked to form the handles 9.

The iron bars 10 have their ends 11 bent into lines parallel with the side bars 3, and said ends 11 are placed against the outer faces of said side bars 3 at points adjacent to the ends of the cross-piece 7, and the bolt 12 is inserted through said ends 11 and through the side bars 3, as required, to hold the parts together. The central portions of the iron bars 10 extend outwardly from the side bars 3 at angles of approximately thirty degrees, and the ends 13 of said iron bars are bent into lines parallel with the ends 14 of the side bars 3, said ends 14 being substantially parallel with each other.

The spools of wire 15 are placed in alinement and the rod 16 is inserted through the ends 13, through the spools 15, and through the ends 14, as required to form a spindle upon which said spools may turn.

When it is desired to distribute the wire, the outer ends of the wire are attached to a post, the operator turns his back to the spools and to the post, takes a position between the handles 9, and takes said handles in his hands and walks away from the post, and the spools 15 roll upon the ground and unwind the wire, and the wire is thus deposited upon the ground beside the posts.

When it is desired to distribute but one line of wire at a time, the iron bars 10 may be removed and a short bolt substituted for the bolt 16.

My device is especially convenient and useful when it is desired to distribute wire through timber, where it is difficult or impossible for two men to walk side by side. Another advantage in the use of my device is the fact that the spools roll upon the ground and one man can distribute the wire as easily and as rapidly as two men could by carrying the spool between them.

When it is desired to take up the wire, the end of the wire is attached to the empty spool and the device is drawn toward the wire or toward the opposite end of the wire from the attached end. The spool will be rotated by contact with the ground, and the wire will be wound upon the spool.

I claim—

In a device for distributing fence-wire, two side bars having handles at one end and alined bearings at the opposite end, suitable cross-pieces rigidly connecting said side bars, bars attached to opposite sides of said side bars at points intermediate of their ends and extending outwardly and toward the bearing ends of said side bars, the last-mentioned bars having bearings in alinement with the first-mentioned bearings, and a shaft operating in all of said bearings, substantially as specified.

In testimony whereof I affix my signature in presence of two witnesses.

FRED S. YOUNG.

Witnesses:
  GEO. COX,
  E. D. CRAMER.